United States Patent [19]
Jaquet

[11] 3,835,546
[45] Sept. 17, 1974

[54] MEASURING DEVICE FOR CHECKING AND/OR CORRECTING THE TRANSVERSE SLOPE OF RAILWAY TRACKS

[75] Inventor: Andre Gustave Jaquet, Crissier, Switzerland

[73] Assignee: Canron, Inc., Phillipsburg, N.J.

[22] Filed: Nov. 6, 1972

[21] Appl. No.: 303,817

[30] Foreign Application Priority Data
Nov. 12, 1971 Switzerland.................... 16468/71

[52] U.S. Cl..................................... 33/338, 33/366
[51] Int. Cl............................................ B61k 9/08
[58] Field of Search............................ 33/338, 366

[56] References Cited
UNITED STATES PATENTS

| | | | |
|---|---|---|---|
| 2,252,727 | 8/1941 | Pepper................................ | 33/366 |
| 2,893,134 | 7/1959 | Shea et al. .......................... | 33/366 |
| 3,198,135 | 8/1965 | Plasser et al........................ | 33/338 |
| 3,271,650 | 9/1966 | Riddle................................ | 33/366 |
| 3,448,522 | 6/1969 | Plasser et al...................... | 33/366 X |
| 3,505,742 | 4/1970 | Fiechter............................. | 33/338 |

Primary Examiner—William D. Martin, Jr.

[57] ABSTRACT

An improved measuring device for checking and/or correcting the local transverse slope of railway tracks is disclosed. The device includes a rigid chassis having sensors positioned to rest on two lines of rails in a transverse vertical plane to the track supports, and a clinometer of the electrolytic spirit level type able to supply an electrical signal proportional to its slope in said plane. The clinometer is mounted to rotate about an axis perpendicular to the plane and is continually returned to the horizontal position by a motor which is supplied with an electrical signal from said clinometer. The motor acts simultaneously on the drive of a movable member of a transducer to supply an electrical signal proportional to the degree of rotation of the clinometer relative to the rigid chassis. This degree of rotation corresponds to the local transverse slope of the track to be measured.

4 Claims, 4 Drawing Figures

3,835,546

MEASURING DEVICE FOR CHECKING AND/OR CORRECTING THE TRANSVERSE SLOPE OF RAILWAY TRACKS

FIELD OF INVENTION

The present invention relates to a measuring device for checking or correcting the transverse slope of railway tracks.

DESCRIPTION OF PRIOR ART

Measuring devices for checking or correcting the transverse slopes of railway tracks are known. In the known devices a measuring apparatus of the clinometer type produces a signal proportional to the degree of local slope of the track in the transverse vertical plane thereto. This signal is used either to control a recording apparatus for checking the transverse levelling or for controlling the operation for correcting levelling during maintenance or renewal work. The signal can also control both checking and levelling simultaneously.

Measuring devices of this type are known in which a pendulating weight drives a potentiometer or inductive transducer via a mechanical drive without contact. A measuring signal in the form of an electrical datum is thus obtained. However, these devices are large and need weights. It thus becomes necessary to reduce the accelerations to attempt to eliminate spurious data produced, for example, by shocks and vibrations due to the levelling work performed by the tamping — levelling machines, or to the speed of the control vehicles on which the devices are used. In this connection devices have been proposed having either continuous damping in which the pendulating weight is immersed in oil or timed damping in which the pendulating weight is blocked mechanically in its position as soon as a spurious datum is received. However, these devices have problems of sealing and problems due to the large inertia of the moving weights to be blocked. Moreover these damping devices have the disadvantage of slowing to a certain extent the response time of the pendulating weight.

Devices are also known wherein the electrical datum is received directly on a clinometer of the electrolytic spirit level type. However the degree of precision required at present in the field of checking and correcting railway tracks necessitates high precision electrolytic spirit levels such as used in ships. This results in high expense. These spirit levels are also unsuitable for resisting for long periods the shocks and accelerations occurring in a field for which they were not designed.

SUMMARY OF INVENTION

The invention seeks to provide an electrical measuring signal for the local transverse slope of a railway track having a sufficiently high precision to satisfy present requirements by means of an electro-mechanical assembly of reduced size with minimum sensitivity to shocks and vibrations, but still having an acceptable response time, a long life and a low cost.

The device according to the invention comprises a rigid chassis with sensors resting on the two lines of rails in a vertical transverse plane to the track. The chassis supports an electrolytic spirit level clinometer supplying an electrical signal proportional to the measurement of its slope in said plane. The device is characterised in that the clinometer is mounted to rotate about an axis perpendicular to said plane and is continuously brought into the horizontal position by a motor supplied by the electrical signal from the clinometer. The motor acts simultaneously on the drive of the movable member of a transducer to supply an electrical signal proportional to the degree of rotation of the clinometer relative to the rigid chassis. The degree of rotation corresponds to the local transverse slope of said track to be measured.

Such a device permits the use of a standard electrolytic spirit level and the reduced dimensions permit a small and low inertia assembly that is robust. The device also assures sufficient precision for transforming the slope signal into a corrective action of the slope, hence it is substantially always horizontal. It is sufficient for the spirit level to be a zero model with a stable and constant damping coefficient.

To obtain a sufficient definition of the measurement on the transducer it is advantageous to insert a reduction ratio in the rotation drive connecting the motor and transducer to the spirit level in such a way that the displacement of the movable member of the transducer is sufficient for slope variations of the order of the minimum degree of precision required.

In a preferred embodiment of the device according to the invention an active filter is provided in the electrical signal transmission circuit connecting the clinometer to the motor. The circuit also has the members necessary for processing, regulation and amplification of the signal. The damping characteristics of the filter are so selected that the motor only reacts to normal variation speeds for the degree of slope of the spirit level. This avoids any spurious information caused by shocks and vibrations.

BRIEF DESCRIPTION OF DRAWINGS

The attached drawing shows as an example a preferred embodiment of the measuring device according to the invention.

FIG. 1 shows two lines of rails 1 and 1a and a sleeper 2 in a zone of the railway track where it is desired to locally measure the transverse slope. In a transverse vertical plane to said track is shown the measuring device which comprises a rigid chassis 4 with sensors 3 and 3a resting respectively on the rails 1 and 1a. To the rigid chassis is fixed a electro-mechanical measuring system 5 for the transverse slope sensed in this manner. This device can be associated either with a railway track maintenance machine or with a checking vehicle depending on whether it is to be used for correction or checking or both.

Figure 3:
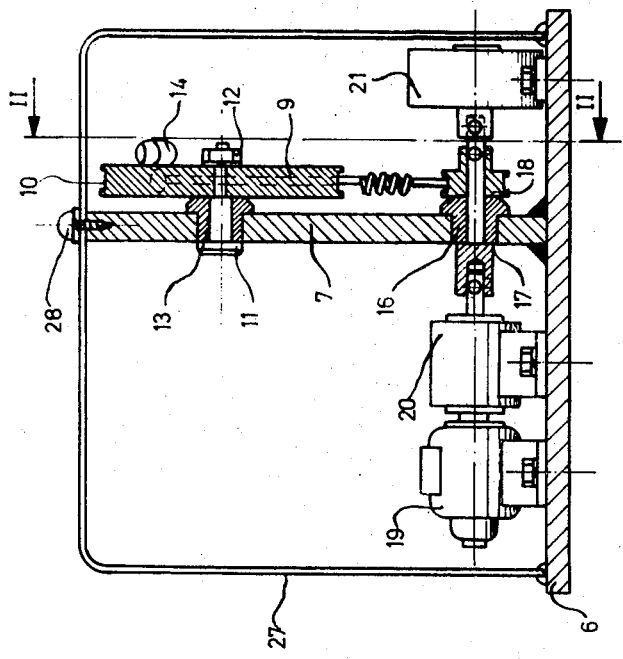
FIG. 3 is a side section along the line I—I of FIG. 2 of said mechanical part.
Figure 1:
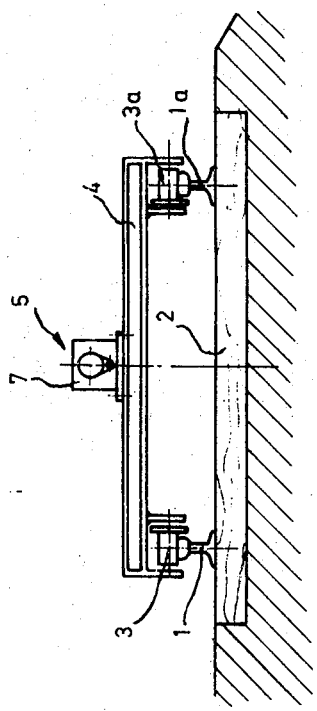
FIG. 1 is a very simplified diagram of the device.
Figure 2:
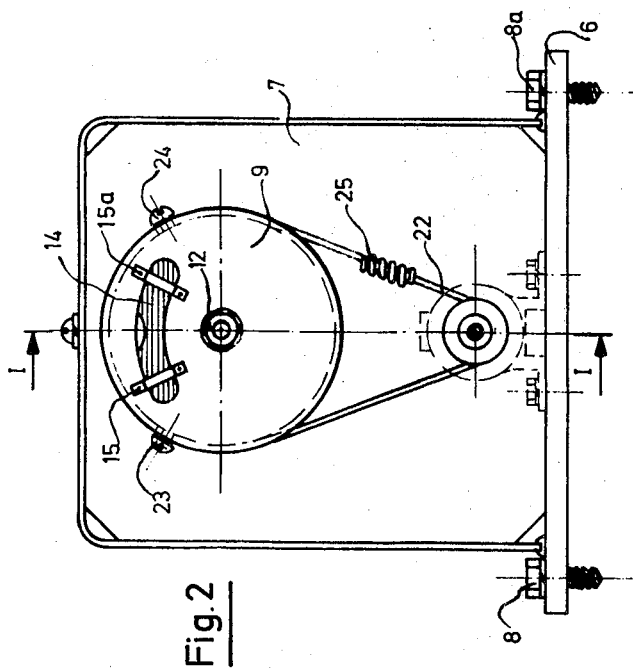
FIG. 2 is a front view along the line II—II of FIG. 3 of the mechanical part of the electro-mechanical measuring system.

The mechanical part of this electro-mechanical system, which is shown in FIGS. 2 and 3, comprises a frame consisting of two T welded metal sheets 6 and 7. The sheet 6 acting as the base is fixed with the aid of bolts 8 and 8a to the chassis 4 (FIG. 1). On the vertical metal sheet 7 is rotatably mounted a disc 9 with a groove 10. The disc 9 is mounted on a shaft 11 perpendicular to the metal sheet 7, which itself is located in a vertical plane transverse to the track, as shown in FIG. 1. This shaft 11 has a lock nut 12 for the disc 9 and rotates in a bearing 13 in the metal sheet 7. An electrolytic spirit level 14 is positioned and fixed on disc 9 by straps 15 and 15a.

On the metal sheet 7 a second bearing 16 supports a second shaft 17. The second shaft 17 has a grooved pulley 18 mounted and locked on it. This shaft 17 is connected at one of its ends to a motor-reducer system 19, 20 bolted to the metal sheet 6. The other end is connected to a potentiometer 21, which is also bolted to the metal sheet 6. This motor-reducer-pulley-potentionmeter system 19, 20, 18 and 21 is mounted and arranged in such a way that there can be no possible displacement between their respective degrees of rotation relative to that of the shaft 17.

The pulley 18 is connected to the disc 9 by a cable 22 wound several times about the pulley 18 and fixed by its two ends to two points 23 and 24 in the groove 10 of disc 9. A spring 25 is inserted in this cable connection to maintain the latter under tension in such a way as to prevent any sliding around the pulley 18. The ratio of the diameters of the disc 9 and the pulley 18 must be made relatively large (of the order of 10 : 1) to obtain a sufficient definition of the measurement of the minimum degree of rotation of the disc on potentiometer 21. A detachable cover serving as a protection 27 is provided, retained by a screw 28.

Figure 4:
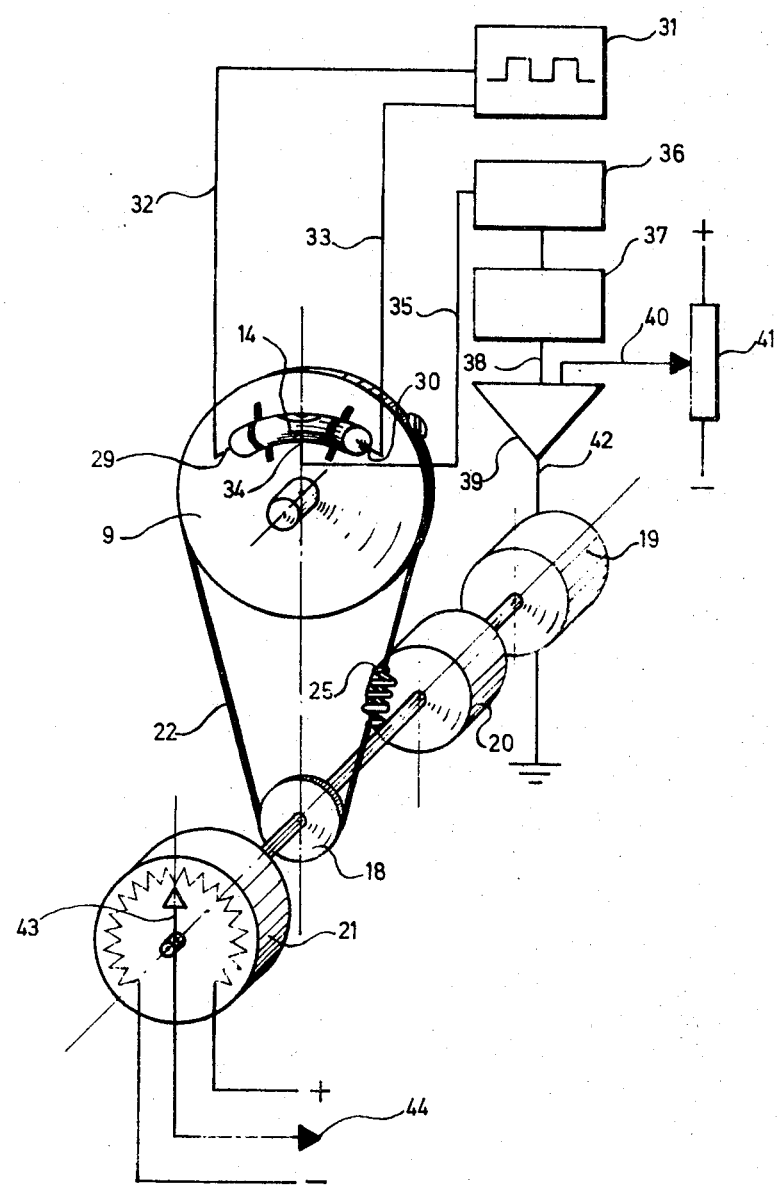
FIG. 4 is a block diagram of the electro-mechanical measuring system illustrating its operation.

The components of the electrical measuring circuit have not been shown in FIGS. 2 and 3 for reasons of clarity. These components are shown in the block diagram of FIG. 4 wherein the already described components reappear with the same reference numerals.

The proportional type electrolytic spirit level 14 is excited between its two ends 29 and 30 by an oscillator 31 to which it is connected by connections 32 and 33. The oscillator produces a square signal without continuous component. The information on the degree and direction of the slope from the spirit level is obtained at its central point 34 in the form of a square signal the amplitude of which depends on the degree of slope of the spirit level and the phase of the direction of slope. This signal is directed from its central point 34 by a connection 35 to a phase detector 36 followed by an active filter 37 to obtain a continuous electrical signal of amplitude sign that is a function of the degree of slope of the spirit level and of its direction.

This signal is then directed by a connection 38 to an amplifier 39 where, by means of a potentiometer 41, a second input 40 permits an electrical adjustment of the zero of the measuring circuit when the spirit level is horizontal. The amplified output signal is directed by the connection 42 to the d.c. motor 19 which drives the pulley 18 via the mechanical reducer 20 when the spirit level is not in the horizontal position. The damping characteristics of the active filter are selected so that the motor 19 only reacts for normal variations in the degree of slope of the spirit level. In this way all shocks and vibrations are damped and have no effect on the normal position of the spirit level.

In its rotational movements the pulley 18 also drives the wiper 43 of potentiometer 21. This potentiometer is supplied at each of its ends by a highly stabilized voltage of the same value but of reverse sign. Thus its wiper 43 provides a datum in the form of a continuous electrical signal whose amplitude is proportional to the measured slope and whose sign depends on the direction of this slope. This measuring signal is then directed via connection 44, as required, either to a control device for the correction of the transverse levelling of the track equipping a track working vehicle or to a device recording the transverse levelling of the sensed track or to these two devices simultaneously.

The potentiometer 41 permits the setting of a zero voltage on the measuring potentiometer 21 when the measuring device is horizontal.

It is obvious that this embodiment of the device according to the invention given as an example is not restrictive and all variants thereof are possible without departing from the scope of the invention.

However, this embodiment permits great flexibility of adaptation to each particular application in the field of correcting and checking the transverse levelling of railway tracks by an appropriate choice of the damping characteristics of the active filter as well as the electrolytic spirit level which control the response rate and the degree of sensitivity to shocks and vibrations.

Another important advantage is the low cost of producing such a device as well as its reliability. The majority of the components used in the manufacture of the device are relatively cheap and widely available.

What I claim as my invention is:

1. A measuring device for checking or correcting the local transverse slope of railway tracks, comprising: a rigid chassis, sensors connected to said chassis and positioned to rest on two lines of rails in a transverse vertical plane to the railway tracks; a clinometer of the electrolytic spirit level type including means to supply an electrical signal proportional to its slope in said plane and supported by said chassis, said clinometer being mounted to rotate about an axis perpendicular to said plane; a motor operatively connected to said clinometer for continually returning said clinometer to a horizontal position by means of the electrical signal generated by said clinometer and applied to said motor; and a transducer having a movable member coupled to said motor for generating an electrical signal proportional to the degree of rotation of the clinometer relative to the rigid chassis, said degree of rotation corresponding to the local transverse slope of the track to be measured.

2. A device according to claim 1, further comprising a speed reducer coupled to said motor and to said clinometer for obtaining an adequate definition of the rotational measurements on said transducer.

3. A device according to claim 2 wherein said means to supply an electrical signal proportional to the slope includes an active filter operatively connected thereto and having appropriate characteristics to insure that the motor only reacts to normal variation rates in the slope of the clinometer.

4. A device according to claim 3 wherein said clinometer comprises an electrolytic spirit level positioned for rotation about said axis, an oscillator coupled to the ends of said level for producing a continual discrete square wave output applied to said level, a phase detector coupled centrally of said level for obtaining information from said level indicative of the slope thereof, an active filter coupled to said phase detector for obtaining a continuous electrical signal indicative of the slope and direction of the spirit level, and amplifier means coupled to said filter and including adjusting means for zeroing the output of said amplifier means when the spirit level is horizontal, said amplifier means being coupled to said motor.

* * * * *